A. C. TILGNER.
TRACTION AND TIRE PROTECTING DEVICE FOR AUTOMOBILES.
APPLICATION FILED NOV. 18, 1915.
1,228,619. Patented June 5, 1917.
2 SHEETS—SHEET 2.
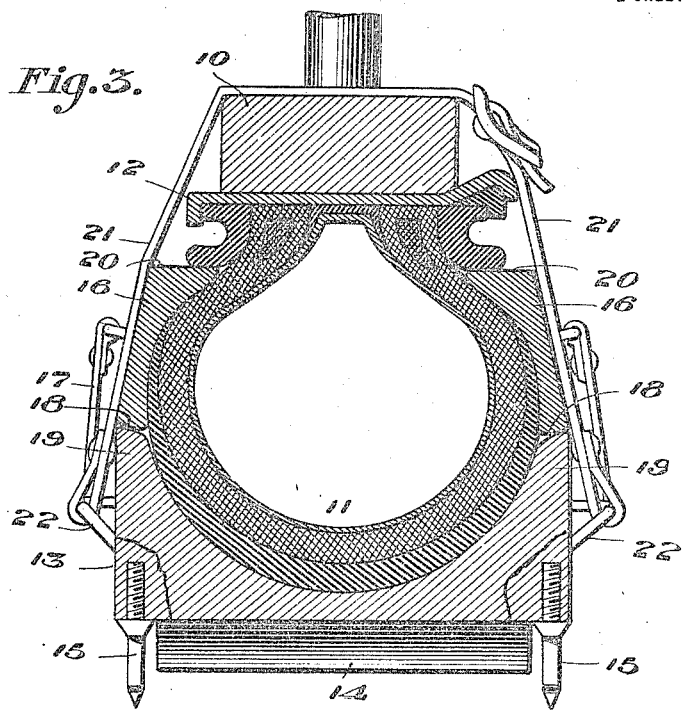
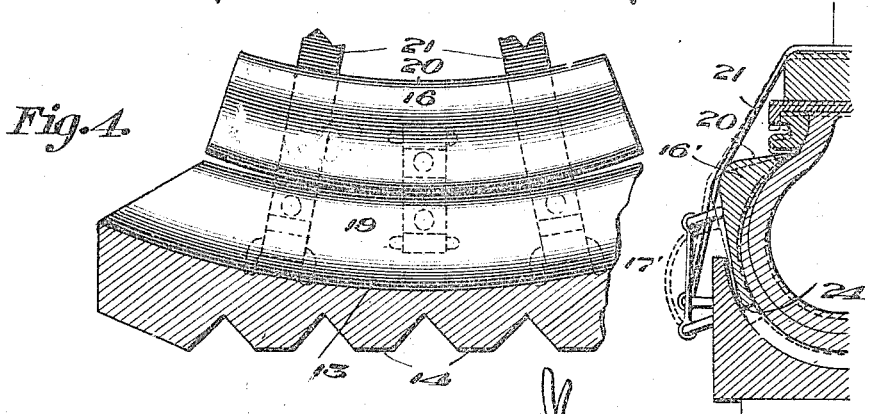
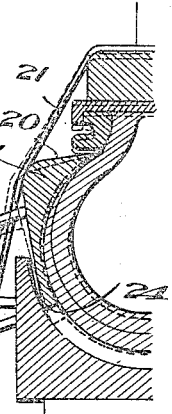
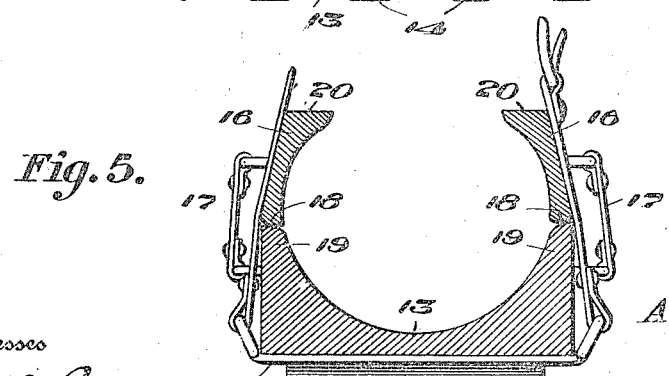
Inventor
A. C. Tilgner

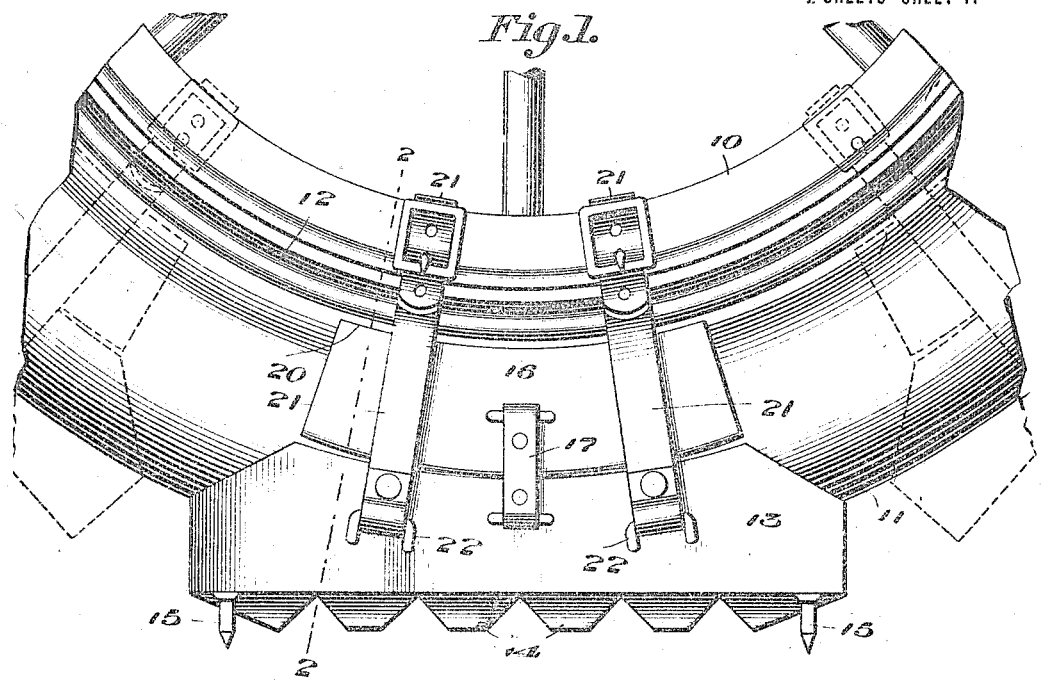
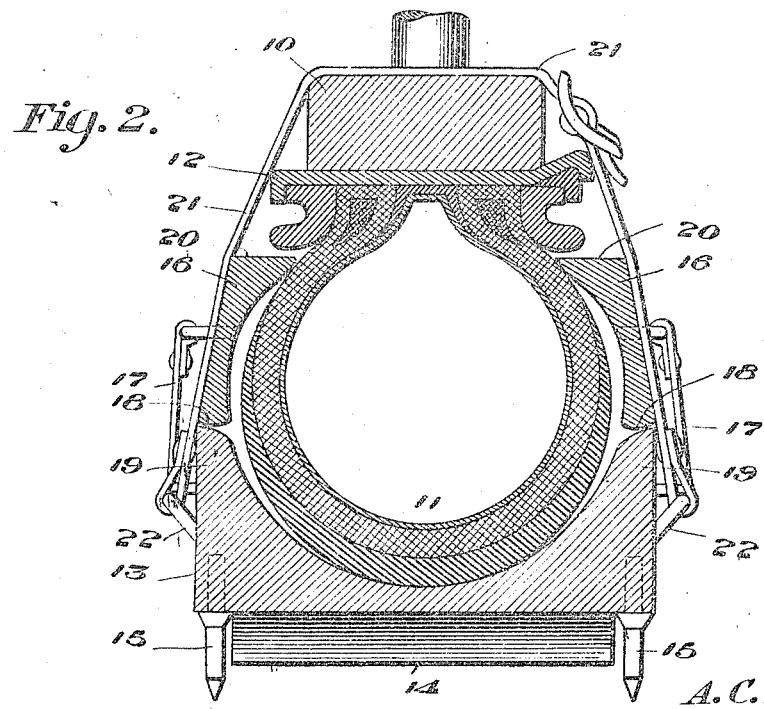

UNITED STATES PATENT OFFICE.

ARTHUR C. TILGNER, OF NORTHVILLE, SOUTH DAKOTA.

TRACTION AND TIRE-PROTECTING DEVICE FOR AUTOMOBILES.

1,228,619.

Specification of Letters Patent.

Patented June 5, 1917.

Application filed November 18, 1915. Serial No. 62,140.

*To all whom it may concern:*

Be it known that I, ARTHUR C. TILGNER, a citizen of the United States, residing at Northville, in the county of Spink and State of South Dakota, have invented new and useful Improvements in Traction and Tire-Protecting Devices for Automobiles, of which the following is a specification.

The present invention relates to traction and tire protecting devices for automobiles.

It has for its object to provide a shoe which may be readily attached to automobile wheels to increase the traction thereof, and which, in event of deflation of the tire, will serve to support and carry the load without damage to such deflated tire.

I accomplish this object by providing shoes adapted to be fitted to an automobile tire in such numbers and in such angularly spaced relation about the circumference thereof as may be desirable, which shoes comprise a main traction member, designed to seat on the periphery of the tire, and relatively movable side members carried by said main traction member, which overlie the sides of the tire when it is in normal inflated condition, and which are adapted to automatically engage the wheel rim and carry the load if the tire becomes deflated.

In the drawings herewith I have shown one embodiment of my invention, but it will be understood that such disclosure is illustrative and not restrictive, as variations in structure from that shown in the drawings and described in the following specification may be made without departing from my invention.

In said drawings,—

Figure 1 is a side elevation of part of an automobile wheel with my traction device applied thereto.

Fig. 2 a transverse sectional view on approximately the line 2—2 of Fig. 1.

Fig. 3 is a transverse section on substantially the same line of section as Fig. 2, but illustrating the condition of the device when the tire is deflated, portions of the main member 13 being broken away longitudinally to disclose the threads on the spurs 15.

Fig. 4 is a longitudinal section of the traction device to show the relation of the main traction member and the side members.

Fig. 5 is a transverse section of the shoe showing a slightly different method of fastening the device to the tire.

Fig. 6 is a partial transverse section through a modified form of my device.

Referring to the drawings by numerals, the same numbers indicating the same parts in the several views, 10 designates an automobile wheel of any usual or desired construction, having a pneumatic tire 11, which tire is secured, as is usual, to a rim 12.

The traction device which I have invented and which is applicable to the tire shown and described, comprises the main member 13 provided with a curved, tire-receiving seat on its inner face and having on its outer face a series of projections 14, which may be supplemented by spurs 15, so that a suitable road-gripping surface will be afforded. The spurs 15 may be secured to the member 13 in any suitable manner, but preferably the shanks of the same are threaded so the spurs may be readily detached when desired.

The said member 13 forms a seat or cradle in which the tire rests, and coupled to said member 13 are side pieces 16, which, as shown, are grooved on their inner faces to conform to the sides of the tire 11, and are connected to the member 13 by hinge elements or flexible connections 17 so as to permit them to rock relatively with respect to the member 13.

Said side-pieces 16 are so curved and angled at their outer edges 18, which rest upon the sides 19 of the member 13, as to permit an inward rocking movement of the said side-pieces, from the position shown in Fig. 2, when the tire 11 is inflated, to that shown in Fig. 3, where the tire is deflated. At their inner edges said side-pieces 16 have a relatively wide, well-defined ledge or bearing surface 20, which, as shown in Fig. 3, engages the rim 12 of the wheel 10 when the tire 11 is deflated, so as to support and carry the rim, wheel, and load, and prevent destructive weight upon the flattened or deflated tire. One of the bearing surfaces 20 also engages the rim 12 of the wheel 10 when pressure is applied to only one side of member 13, so that turning of the latter about the tire is prevented.

It will be seen that the relation of the side pieces 16 to the member 13 is such that it automatically falls inwardly on collapse of the tire, with its ledges or bearing surfaces 20 against the outer edge of the rim 12, the curvature and angular relation of the meeting faces of the member 13 and side pieces 16 permitting this inward movement of said side pieces.

The traction device is secured to the wheel by any suitable means, as straps 21, which may be secured to loops 22 on the side faces of members 13, so that the tension of the straps 21 tends to force the side-pieces 16 inwardly against the tire 11 and against the edge of the rim 12.

Instead of attaching these holding straps as shown in Figs. 1, 2, 3, and 4, they may be secured as illustrated in Fig. 5, in which a rod or bar 23 is provided, said bar being designed to be between the projections 14 on the outer surface of the shoe and having a loop at each end to which the straps are secured.

In Fig. 6 I show a modified construction of my shoe, wherein are provided side-pieces 16′ which are adapted to move inwardly toward the tire, but in place of moving inwardly at their inner edges they are adapted to swing outwardly of the wheel and inwardly of each other at their outer edges when the tire is deflated. In this arrangement the outer edges 24 of the side-pieces 16′ do not rest upon the sides of the member 13 but extend within the concave portion of the member 13. The side-pieces 16′ are secured to the member 13 by resilient straps 17′, and the shoe is held in place upon the wheel by the straps 21, all as hereinbefore described. When the tire becomes deflated, the inner edges 20 of the side-pieces 16′ are engaged by the rim of the wheel and the side-pieces move outwardly and toward each other into the concave portion of the member 13, this movement being limited by the tire which, although it may be deflated, has sufficient body or resiliency to resist abnormal distortion and the tire does not collapse completely. When the tire is inflated it expands and pushes the side-pieces into the full line position shown in Fig. 6. It will be noted that with this construction the tire acts as a cushion between the side pieces 16′ and excess jarring upon the rim when the tire is deflated is eliminated, and excessive strains upon the side-pieces are avoided.

In applying the device, any suitable number of shoes may be used and they may be arranged close together or at such angular distances from one another as may be desirable.

Such departures from the construction herein set forth to illustrate my invention as are obvious mechanical expedients are to be regarded as within the purview thereof.

I claim:—

1. A traction device for wheels, comprising a tire-receiving member, side pieces connected with said member and movable inwardly toward each other, and means for securing said device to a wheel.

2. A traction device for wheels comprising a tire-receiving member, side pieces having rim-engaging ledges hinged to said member and movable inwardly toward each other, and means for securing said device to a wheel.

3. A traction device for wheels comprising a tire-receiving member, hinged side-pieces having a rocking engagement with said member and movable inwardly toward each other, and means for securing said device to a wheel.

4. A traction device for wheels comprising a tire-receiving member, side-pieces supported by said member and movable inwardly toward each other on collapse of the tire, rim-engaging ledges on said side-pieces, and means for securing said device to a wheel.

5. A traction device for wheels, comprising a tire-receiving member, grooved tire-engaging side-pieces hinged to said member and movable inwardly toward each other, rim-engaging ledges on said side-pieces, and fastening means tending to force said side-pieces inwardly.

6. A traction device for wheels, comprising a tire-receiving member, rim-engaging side-pieces connected and movable inwardly toward each other, and a fastening formed of a rigid bar seated against the outer face of said member, and a flexible connection engaging said side-pieces to secure said device to a wheel.

In testimony whereof I have hereunto set my hand in presence of two subscribing witnesses.

ARTHUR C. TILGNER.

Witnesses:
Z. P. MUSTAR,
P. F. HENNING.